(12) United States Patent
Joshi

(10) Patent No.: US 11,345,285 B2
(45) Date of Patent: May 31, 2022

(54) SIDE STORAGE ACCESS FOR TRUCK FROM VEHICLE EXTERIOR

(71) Applicant: Toyota Motor Engineering & Manufacturing North America, Inc., Plano, TX (US)

(72) Inventor: Chetan Joshi, Ypsilanti, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 289 days.

(21) Appl. No.: 16/660,092

(22) Filed: Oct. 22, 2019

(65) Prior Publication Data

US 2021/0114530 A1 Apr. 22, 2021

(51) Int. Cl.
*B60R 9/06* (2006.01)

(52) U.S. Cl.
CPC .................................. *B60R 9/065* (2013.01)

(58) Field of Classification Search
CPC .. B60R 5/00; B60R 5/04; B60R 5/041; B60R 7/02; B60R 9/065; B60J 5/0491; B60J 5/0498; B62D 25/087
USPC ............................. 296/37.6, 0.14, 0.16, 24.3
See application file for complete search history.

(56) References Cited

U.S. PATENT DOCUMENTS

| | | | |
|---|---|---|---|
| 4,613,183 A | 9/1986 | Kesling | |
| 4,917,430 A | 4/1990 | Lawrence | |
| 5,316,358 A * | 5/1994 | Payne | B60R 5/00 296/186.4 |
| 5,615,922 A * | 4/1997 | Blanchard | B60R 9/02 224/404 |
| 5,895,086 A | 4/1999 | Carico | |
| 5,934,727 A | 8/1999 | Storc et al. | |
| 6,030,018 A | 2/2000 | Clare et al. | |
| 6,155,625 A * | 12/2000 | Felix | B60R 9/00 296/37.1 |
| 6,447,051 B1 * | 9/2002 | Lukomskiy | B60P 3/40 296/100.03 |
| 6,474,715 B2 | 11/2002 | Fukushima et al. | |
| 7,097,224 B2 * | 8/2006 | Lester | B60R 9/00 224/404 |
| 7,118,150 B2 * | 10/2006 | Bruford | B60R 3/02 296/37.1 |
| 7,219,941 B1 * | 5/2007 | San Paolo | B60R 9/00 224/404 |
| 8,038,195 B1 | 10/2011 | Hutcheson | |
| 8,317,252 B2 * | 11/2012 | Kimmet | B60J 7/061 296/76 |
| 9,409,525 B2 * | 8/2016 | Gillam | B62D 33/023 |
| 2005/0140159 A1 * | 6/2005 | Barber | B60R 11/00 296/37.6 |

(Continued)

FOREIGN PATENT DOCUMENTS

| | | |
|---|---|---|
| DE | 102005002577 B3 | 10/2006 |
| DE | 102008010134 A1 | 8/2009 |
| EP | 3147160 A2 | 3/2017 |

*Primary Examiner* — Joseph D. Pape
*Assistant Examiner* — Veronica Marie Shull
(74) *Attorney, Agent, or Firm* — Christopher G. Darrow; Darrow Mustafa PC

(57) ABSTRACT

A pickup truck includes a cab having a front row of seating, and a rear row of seating, and a cargo bed residing behind the cab. A storage compartment is positioned behind the cab. At least a portion of the storage compartment is positioned directly underneath the cargo bed.

5 Claims, 2 Drawing Sheets

(56) References Cited

U.S. PATENT DOCUMENTS

2015/0375690 A1* 12/2015 Beasley .................. B60R 9/02
                                                                                                      296/37.6
2020/0062185 A1* 2/2020 Scaringe .................. B60R 3/00

* cited by examiner

SIDE STORAGE ACCESS FOR TRUCK FROM VEHICLE EXTERIOR

TECHNICAL FIELD

The present invention relates to vehicle storage compartments and, more particularly, to a storage compartment in a pickup truck which is accessible from an exterior of the truck.

BACKGROUND

Because pickup trucks may not have the storage areas (such as a trunk) found on many other vehicles, pickup truck owners may find it necessary to manipulate a heavy tailgate or tonneau cover in order to position and secure items (such as groceries or relatively smaller items) for transport.

SUMMARY

In one aspect of the embodiments described herein, a pickup truck includes a cab having a front row of seating, and a rear row of seating, and a cargo bed residing behind the cab. A storage compartment is positioned behind the cab. At least a portion of the storage compartment is positioned directly underneath the cargo bed.

BRIEF DESCRIPTION OF THE DRAWINGS

The accompanying drawings, which are incorporated in and constitute a part of this specification, illustrate embodiments described herein and together with the description serve to explain principles of embodiments described herein.

DETAILED DESCRIPTION

Figure 1:
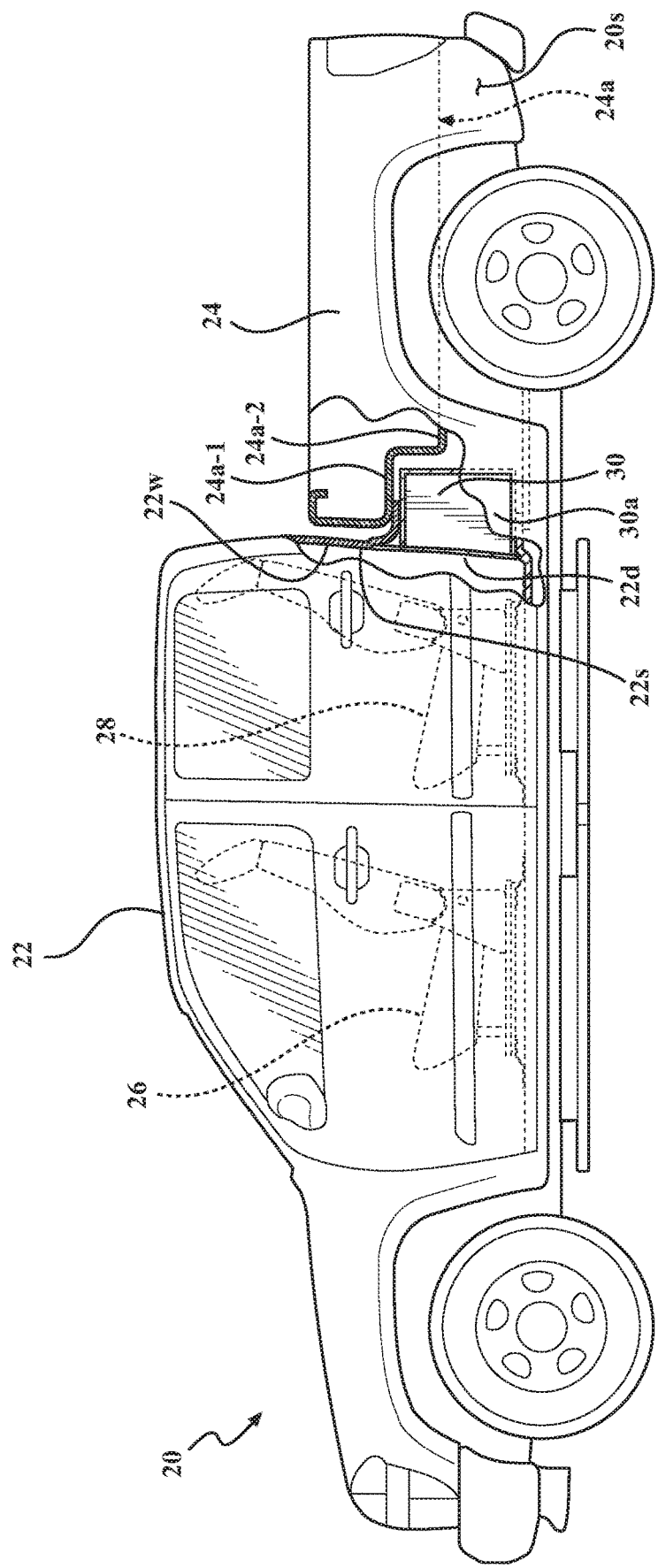
FIG. 1 is a schematic partial cutaway side view of a pickup truck incorporating a storage compartment in accordance with an embodiment described herein.

Embodiments described herein relate to a pickup truck including a securable storage compartment separate from the truck cargo bed and accessible from outside the truck cab, along an exterior surface of one or more sides of the vehicle. In particular embodiments, the storage compartment may also be accessible from inside the cab. At least a portion of the storage compartment may reside below a portion of the cargo bed.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. Unless otherwise noted, similar reference characters are used to describe similar features on separate elements and/or embodiments.

FIG. 1 is a schematic partial cutaway side view of a pickup truck 20 in accordance with an embodiment described herein. Truck 20 may include a cab 22 and a cargo bed 24 residing behind the cab. The dashed line 24a shows a contour of the cargo bed floor between the truck sidewalls. In the embodiment of FIG. 1, a forward portion of the cargo bed floor rises above the level indicated by line 24a to reside over a storage compartment 30, as described in greater detail below. The "cab" is the front portion of the truck 20 in which the vehicle seats (driver, passenger, etc.) are installed. Embodiments of the pickup truck described herein include an enlarged cab. As used herein, the term "enlarged cab" refers to a cab having a row of front seats including at least one front seat 26 (for example, a driver's seat), and at least one row of rear seats 28 including at least one rear seat positioned behind the row of front seats 26. The row of rear seats 28 may be multiple separate seats, or the rear seats 28 may be in the form of a single continuous bench or sofa-like seat.

In one or more arrangements, storage compartment 30 may be positioned within the vehicle body behind the cab 22, such that at least a portion of the storage compartment 30 is positioned directly underneath the cargo bed floor 24a. "Behind the cab" is defined as being behind (i.e., in a direction toward a rear of the vehicle) a plane defining an interior surface 22s of a rearmost wall 22w of the interior of the cab 22. Thus, no portion of the storage compartment 30 intrudes into the interior of cab 22. In one or more arrangements, the storage compartment 30 may be a cavity defined by opposite exterior side walls of the truck, a portion(s) of the cargo bed floor 24a, and the rearmost wall 22w of the cab interior. In particular embodiments, the storage compartment may be formed as a prefabricated enclosure or shell which is positionable and securable beneath a portion of the cargo bed 24, behind the cab 22, and between the truck sidewalls during vehicle assembly. The compartment may then be accessed through exterior and/or cab interior doors as described herein after vehicle assembly.

In the embodiment shown in FIG. 1, the storage compartment 30 is dimensioned such that a first portion 24a-1 of the cargo bed floor 24a residing above the storage compartment is effectively raised above a second portion 24a-2 of the cargo bed floor 24a. Thus, the cargo bed floor 24a has two different heights or levels. This enables a relatively taller or larger storage compartment to be provided.

In one or more arrangements, a storage compartment exterior door 30a may be provided along a first side of the truck to enable access to the storage compartment 30 from an exterior of the cab 22 along the first side of the truck 20. In the embodiment shown in FIG. 1, the left-hand side 20s of the truck is the first side of the truck. However, the first side of the truck 20 may be either the right-hand side of the truck (from the perspective of an occupant seated in the cab 22 and facing in a forward direction of the truck 20), or the left-hand side of the truck. In certain embodiments, storage compartment doors may be provided along both the first side 20s of the truck and a second side (not shown) of the truck opposite the first side 20s of the truck 20, to enable access to the storage compartment 30 from an exterior of the cab 22 along any of multiple sides of the truck 20.

Exterior surfaces of the storage compartment exterior door(s) may be structured to "blend" or be coplanar with adjacent exterior surfaces of the truck 20, in a manner similar to that employed for blending the contours of vehicle fuel doors, for example. A storage compartment exterior door may be releasably locked in a closed condition using any of a variety of known mechanisms, for example latch release-type mechanisms (such as a cable mechanism or electro-mechanical actuator). The door lock may be structured to enable unlocking and opening of the exterior storage compartment door from inside the cab 22, or the door may be secured in a known manner using a lock accessible from the exterior of the cab.

In one or more arrangements, the pickup truck 20 may be structured so that the storage compartment 30 is accessible from an interior of the cab 22. For example, the rear wall 22w of the cab 22 may separate the cab interior from the storage compartment 30. In one or more arrangements, an access door 22d (as shown in FIG. 1) may be provided in the cab wall 22w below or behind one or more of rear seats 28.

In one or more arrangements, the storage compartment 30 may be accessible from one or the other of the truck exterior or the cab interior, as described above. In one or more other arrangements, the storage compartment 30 may be accessible from both the exterior of the cab 22 and from the cab interior.

Figure 2:
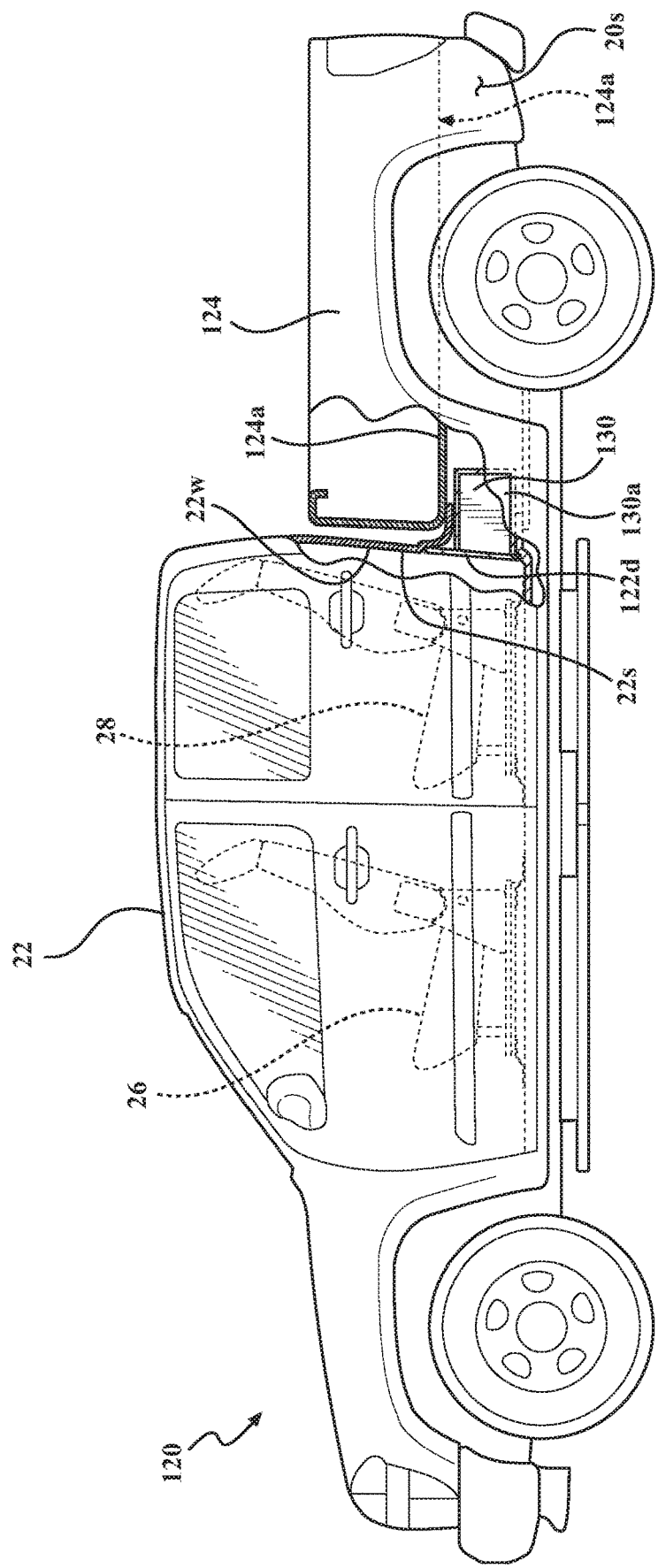
FIG. 2 is a schematic partial cutaway side view of a pickup truck incorporating a storage compartment in accordance with another embodiment described herein.

FIG. 2 is a schematic partial cutaway side view similar to the view of FIG. 1, showing a pickup truck 120 incorporating a storage compartment in accordance with another embodiment described herein. Referring to FIG. 2, in an alternative embodiment, the dashed line 124a shows a contour of the floor of the cargo bed 124 between the truck sidewalls. The entire cargo bed floor 124a may reside at the same level, and the storage compartment 130 may be structured such that the entire storage compartment resides below the level of the cargo bed floor 124a. This embodiment may provide a maximum planar cargo bed floor area for cargo transport. The storage compartment 130 may be accessed through an exterior door 130a and/or a cab interior door 122d as previously described.

Embodiments of the storage compartment described herein may provide a secure, accessible receptacle for storing small items, e.g., groceries. The storage compartment provides easily accessible storage and avoids handling a heavy tailgate and/or heavy truck doors and navigating a high truck bed.

In the above detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . ." as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A pickup truck comprising:
    a cab having a front row of seating and a rear row of seating;
    a cargo bed residing behind the cab; and
    a storage compartment positioned behind the cab, wherein at least a portion of the storage compartment is positioned directly underneath the cargo bed, wherein a first portion of a cargo bed floor resides over the storage compartment, and wherein the storage compartment is structured such that the first portion of the cargo bed floor is raised to a level higher than a level of a second portion of the cargo bed floor not residing over the storage compartment.

2. The pickup truck of claim 1, wherein the truck is structured so that the storage compartment is accessible from an exterior of the cab along a first side of the truck.

3. The pickup truck of claim 2, wherein the truck is structured so that the storage compartment is also accessible from an exterior of the cab along a second side of the truck opposite the first side of the truck.

4. The pickup truck of claim 2, wherein the truck is structured so that the storage compartment is also accessible from an interior of the cab.

5. The pickup truck of claim 1, wherein the truck is structured so that the storage compartment is accessible from an interior of the cab.

\* \* \* \* \*